Patented Nov. 6, 1934

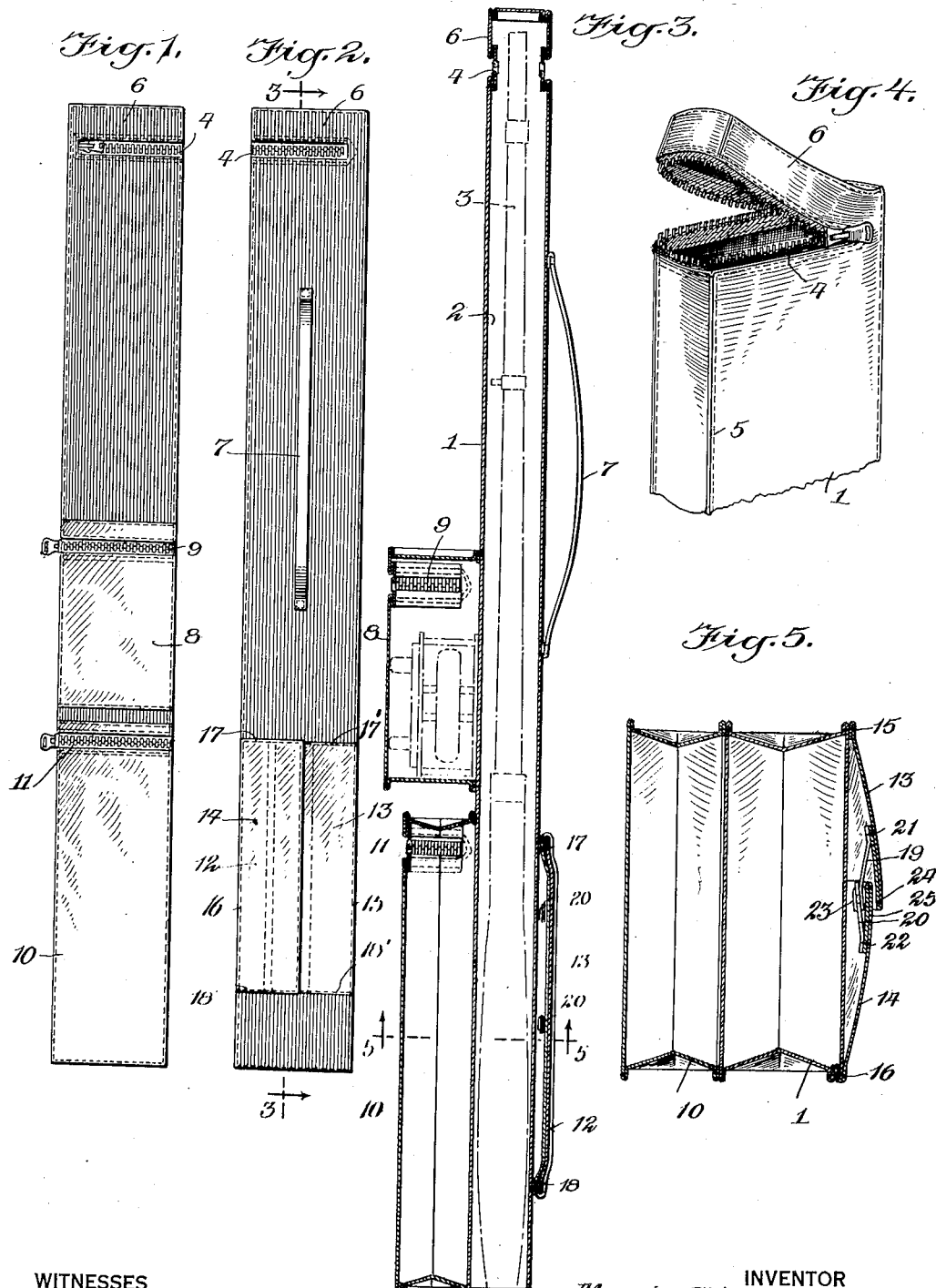

1,980,104

UNITED STATES PATENT OFFICE 1,980,104

FISHING TACKLE CASE

Morris Silverspitz, Brooklyn, N. Y.

Application March 30, 1934, Serial No. 718,269

4 Claims. (Cl. 43—26)

This invention relates to fishing tackle cases and has for an object to provide an improved construction wherein the fishing tackle may be properly carried so that it will not become injured and at the same time will be protected.

Another object of the present invention is to provide a case for fishing tackle wherein the rod may be arranged in one compartment, the reel in another, hooks and lures in another, and miscellaneous articles in another, all being associated together to make a single package.

A further object of the invention is to provide a fishing tackle case wherein the various compartments are provided and normally closed by a slide or talon fastener, the parts being associated together so that a single supporting strap may be used to carry the case.

In the accompanying drawing—

Figure 1 is a plan view of the device with all the parts closed;

Figure 2 is a view from the opposite side to that shown in Figure 1;

Figure 3 is a longitudinal vertical sectional view through Figure 2 on the line 3—3, the same being on an enlarged scale;

Figure 4 is an enlarged perspective view of one end of the case;

Figure 5 is an enlarged sectional view through Figure 3 on the line 5—5.

Referring to the accompanying drawing by numerals, 1 indicates what may be termed a body, which body is the main part of the casing and defines a chamber 2 in which the fishing rod 3 is adapted to be positioned. The body 1 is preferably rectangular as shown in Figure 4, with four flat sides and with a talon or slide fastener 4 arranged near the end whereby the rod 3 may be readily inserted or removed at any time.

The casing 1 is preferably made from fabric, leather or similar material stitched together at the various corners by lines of stitching 5, whereby a very flexible structure is provided which may be folded up when not in use into a comparatively small package, and when in use presenting a chamber 2 which is sufficiently long and roomy to readily receive the rod 3 when disengaged and folded as shown in Figure 3. After the rod has been placed in chamber 2 the slide fastener 4 is actuated until the cap or closure end 6 is closed. The handle 7 is stitched or otherwise secured to the body 1 as shown in Figures 2 and 3 whereby the device may be readily carried.

Chamber 2 takes care of the rod 3, but in order to take care of the reel separately there is provided a pocket 8 of fabric, leather or other material, provided with a slide fastener 9 in a similar manner to the structure shown in Figure 4 whereby access may be readily had to the pocket but the pocket will be locked closed when the fastener has been moved to closed position. If desired, other articles could be arranged in pocket 8 without departing from the spirit of the invention, though it is made preferably of a size to receive a reel.

A second elongated pocket 10 is also provided on the same side of body 1 as pocket 8, said auxiliary pocket 10 having a slide fastener 11 similar to slide fastener 9. This pocket is of the same width as the body 1 and extends from near one end of body 1 to a point near the pocket 8, thus resulting in both pockets 8 and 10 being absolutely independently connected to the body 1.

A third pocket 12 is provided on the opposite side of body 1 to pocket 10, said third pocket being adapted to receive hooks, lures and smaller items, while the pocket 10 is adapted to receive sinkers or any other comparatively large objects. Pocket 12 includes a pair of side flaps 13 and 14 which are stitched at 15 and 16, respectively, to the sides of the body 1 with lines of stitching 17, 17', 18 and 18' transversely of the body 1, as shown in Figure 2. These flaps are positioned to overlap as shown in Figure 5 so that they will normally remain closed but are not fastened by a slide fastener. However, suitable straps 19 and 20 are provided, said straps being stitched at 21 and 22 and connected together at a central point by the snap fasteners 23. As illustrated in Figure 3, there are two sets of straps 19 and 20 with snap fasteners and associated parts, but it is evident that one or more than two could be used without departing from the spirit of the invention. The outer portions 24 and 25 of the flaps or cover members 13 and 14 may be swung back out of the way when the fingers are to be used to engage the snap fasteners 23, and then swung back again to the position shown in Figure 5.

As illustrated in Figures 3 and 5, the case is provided with a number of pockets or chambers all of which are absolutely independent of each other but coacting with the body 1 to form a single case.

It will be noted that the body 1 forms a wall for each of the pockets or chambers and that the pockets are arranged near the center or near one end of the body, so that when an arm is passed through the handle 7 the case will hang downwardly when supplied with a fishing rod and associated parts. By the use of the zipper fasteners all parts are properly locked but may be readily opened and the rod and other parts quickly removed. In this way there is no chance of loss of any of the items and yet all the parts are kept in place and ready for access.

As illustrated in Figure 5, the body 1 and the respective pockets are folded to produce a bellows structure so they may lie flat and present minimum width when not in use but may be readily distended to receive the various articles.

I claim:

1. A fishing tackle case including a rod-receiving body, a reel-receiving pocket on one side of the body, a miscellaneous article-receiving pocket on the same side of the body as the reel-receiving pocket, and a hook-receiving pocket connected to the case on the opposite side of the body to the miscellaneous article-receiving pocket, said hook-receiving pocket having as its inner wall one wall of said body and having for its outer walls a pair of flaps secured along one edge to the side edge of the body, and along one end of each flap to the body, said flaps overlapping at a central point, and a plurality of locking tabs arranged interiorly of the flaps, each pair of tabs having snap fasteners for normally holding the same together and the pocket closed.

2. A fishing tackle case including a body of flexible material adapted to receive a fishing rod, a fish hook pocket, said fish hook pocket having an inner wall formed as part of one side of said body and the outer walls formed of two flaps, said flaps being connected at their outer edges to the body and along a central line being disconnected and overlapping, and a strap connected to each flap interiorly thereof, said straps being long enough to overlap, the overlapping part of said straps being provided with a disengageable fastener.

3. A fishing tackle case comprising a body formed of flexible material and normally closed at both ends, one of said ends of the body being divided transversely except at one point for presenting a swinging cap, a slide fastener for normally closing said cap, a pocket positioned on one of the side walls of the body, said pocket using one of said side walls as one of the walls of the pocket, said pocket at one end having a slit across the outer face and almost across the two side walls, and a slide fastener structure for connecting said slit together normally.

4. A fishing tackle case comprising a body formed of flexible textile fabric, said body being closed at both ends and at one end being divided transversely except at one point, for presenting a swinging cap, and a sliding fastener for normally closing said cap.

MORRIS SILVERSPITZ.